(12) United States Patent
Moriya et al.

(10) Patent No.: US 6,243,536 B1
(45) Date of Patent: Jun. 5, 2001

(54) LENS-FITTED PHOTO FILM UNIT WITH DATA RECORDING DEVICE

(75) Inventors: Mitsuhiro Moriya; Hisashi Tasaka, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/409,696

(22) Filed: Sep. 30, 1999

(30) Foreign Application Priority Data

Oct. 1, 1998 (JP) .................................................. 10-279825

(51) Int. Cl.⁷ ............................. G03B 15/03; G03B 17/24
(52) U.S. Cl. ............................. 396/6; 396/176; 396/267; 396/317
(58) Field of Search ............................... 396/6, 176, 267, 396/317, 318, 316, 315

(56) References Cited

U.S. PATENT DOCUMENTS

| | | | |
|---|---|---|---|
| 4,973,997 | * 11/1990 | Harvey | 396/315 |
| 5,339,125 | * 8/1994 | Fridman et al. | 396/317 |
| 5,486,885 | * 1/1996 | Matsumoto | 396/267 |
| 5,521,665 | * 5/1996 | Petruchik | 396/315 |
| 5,784,658 | * 7/1998 | Hata et al. | 396/176 X |
| 5,892,993 | 4/1999 | Moriya | 396/317 |
| 6,151,452 | * 11/2000 | Ping | 396/315 |

* cited by examiner

Primary Examiner—W. B. Perkey
(74) Attorney, Agent, or Firm—Young & Thompson

(57) ABSTRACT

A lens-fitted photo film unit is provided with a data recording device, wherein a plastic light guide member has a flash light entering portion that is opposed to a front portion of a flash projector of a built-in flash device, and a light projection terminal facing an LCD panel of a data display module. The light guide member also has an external light entering surface that is exposed to a front portion of the film unit, to collect external light and conduct it to the light projection terminal. The light projected from the light projection terminal toward the LCD panel is used for recording data displayed on the LCD panel onto a filmstrip contained in the film unit. When the film unit is used in a dark place, the flash device is activated to project a flash light from the flash projector. So the flash light partly enters through the flash light entering portion, and is added to the external light entering through the external light entering surface.

9 Claims, 8 Drawing Sheets

LENS-FITTED PHOTO FILM UNIT WITH DATA RECORDING DEVICE

BACKGROUND OF THE INVENTION

1. Field of the Invention

The present invention relates to a lens-fitted photo film unit with a data recording device that photographically records data, such as the date of photography, on a filmstrip contained in the lens-fitted photo film unit.

2. Background Arts

Many types of lens-fitted photo film units have been known and sold in the market, that contain a roll of unexposed photo filmstrip and have simple photographic mechanisms for taking pictures on the filmstrip. Hereinafter, the lens-fitted photo film unit will be referred to as a film unit.

Recently, a film unit with a data recording device have been suggested, wherein data displayed on a data display device, such as the date of photography displayed on an LCD (liquid crystal display) panel, is photographically recorded on the filmstrip. On the other hand, cameras with such a data recording device have already been known in the art. Most of the data recording devices incorporated in the cameras use a specific light source, e.g. an LED. However, since the specific light source and a specific circuit for driving the light source increase the production cost and complicate the internal construction, it is not preferable to mount this kind of data recording device in the film unit because the film unit is expected to be simple in construction, and produced at a low cost.

To solve this problem, a data recording device for a film unit has been suggested in a prior art, which is provided with a light converging device, such as a condenser lens, so as to use external light for photographing data on the filmstrip. To enable photographing data on the filmstrip even when the exterior or the room is dark, this prior art suggests using a flash light that is projected from a flash device of the film unit and reflected from a photographic subjected, and then enters through the light converging device into the film unit.

This solution does not need a specific light source for the data recording device, and thus the data recording device does not electrically and mechanically complicate the film unit. However the intensity of the external light obtained through the light converging device, including the flash light reflected from the subject, is not always sufficient for recording data at an adequate density on the filmstrip.

SUMMARY OF THE INVENTION

In view of the foregoing, an object of the present invention is to provide a film unit with a data recording device, which is simple in construction and is always able to record data photographically on the filmstrip at an adequate density without using a specific light source for the data recording.

To achieve the above object, the present invention provides a lens-fitted photo film unit with a data recording device for recording data on a filmstrip contained in the film unit, by projecting a data recording light onto the filmstrip through a data display device that displays the data to record, the film unit is comprised of a first light guide member having an external light entering surface exposed to outside of the film unit, the first light guide member conducting external light that enters through the external light entering surface to the data display device, to use the external light for the data recording light; and a second light guide member for conducting a flash light partly from a built-in flash device of the film unit to the first light guide member, to use the flash light for the data recording light in addition to the external light alone.

Since the flash light from the flash device is conducted as the data recording light to the data display device when the film unit is used in a dark place, it is possible to obtain a sufficient amount of data recording light enough for recording data at an adequate density even where it is impossible to obtain the sufficient amount of light from the external light.

According to a preferred embodiment, at least one of the first and second light guide members is formed from a transparent or semi-transparent plastic. The plastic may be composed by mixing a transparent plastic material with fluorescent dyestuffs. Thereby, light conduction efficiency of the light guide member is improved. It is possible to compose the plastic by mixing a transparent plastic material with dyestuffs that absorbs light components of a predetermined wavelength range, in order to color the data recording light to print the data in a particular color. The first and second light guide members may be formed as an integral light guide member.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limiting the present invention, wherein like reference numerals designate like or corresponding parts throughout the several views, and wherein.

DETAILED DESCRIPTION OF THE PREFERRED EMBODIMENT

Figure 1:
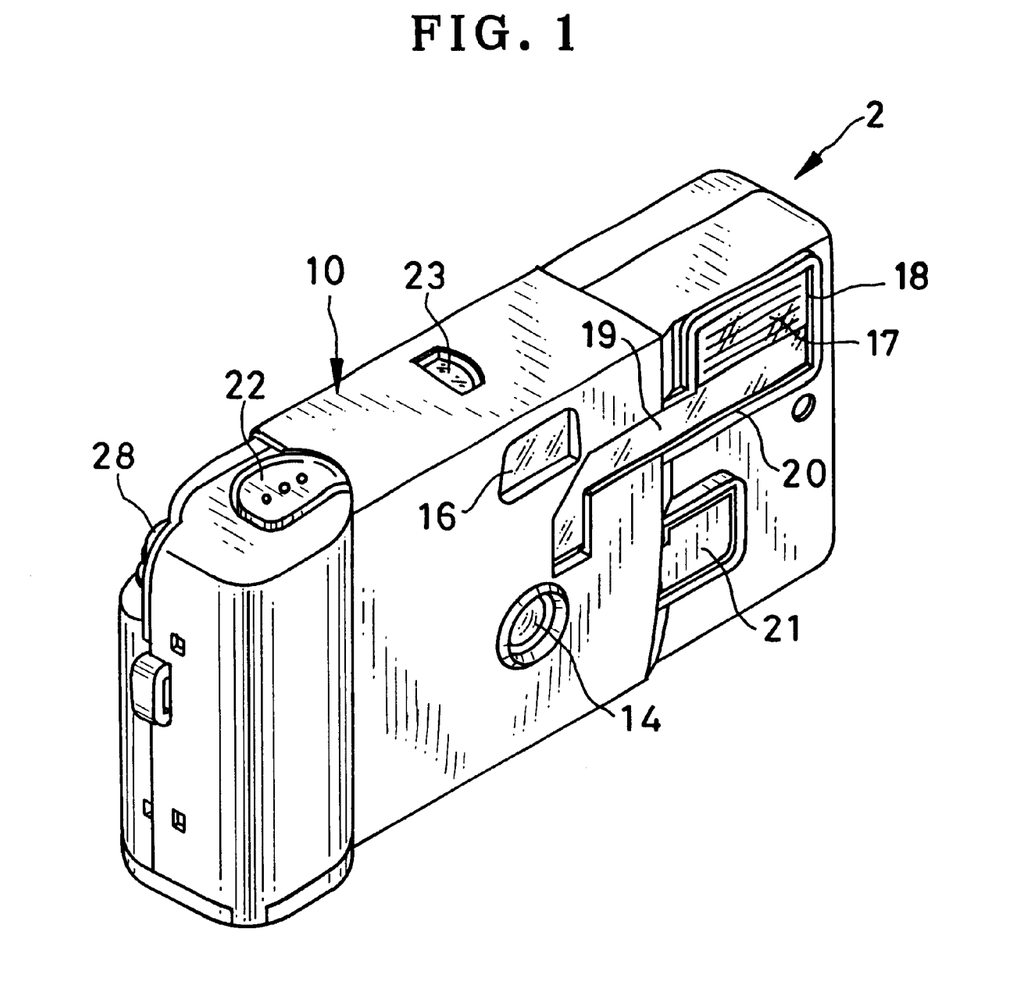
FIG. 1 is a perspective view of a film unit according to an embodiment of the invention.
Figure 2:
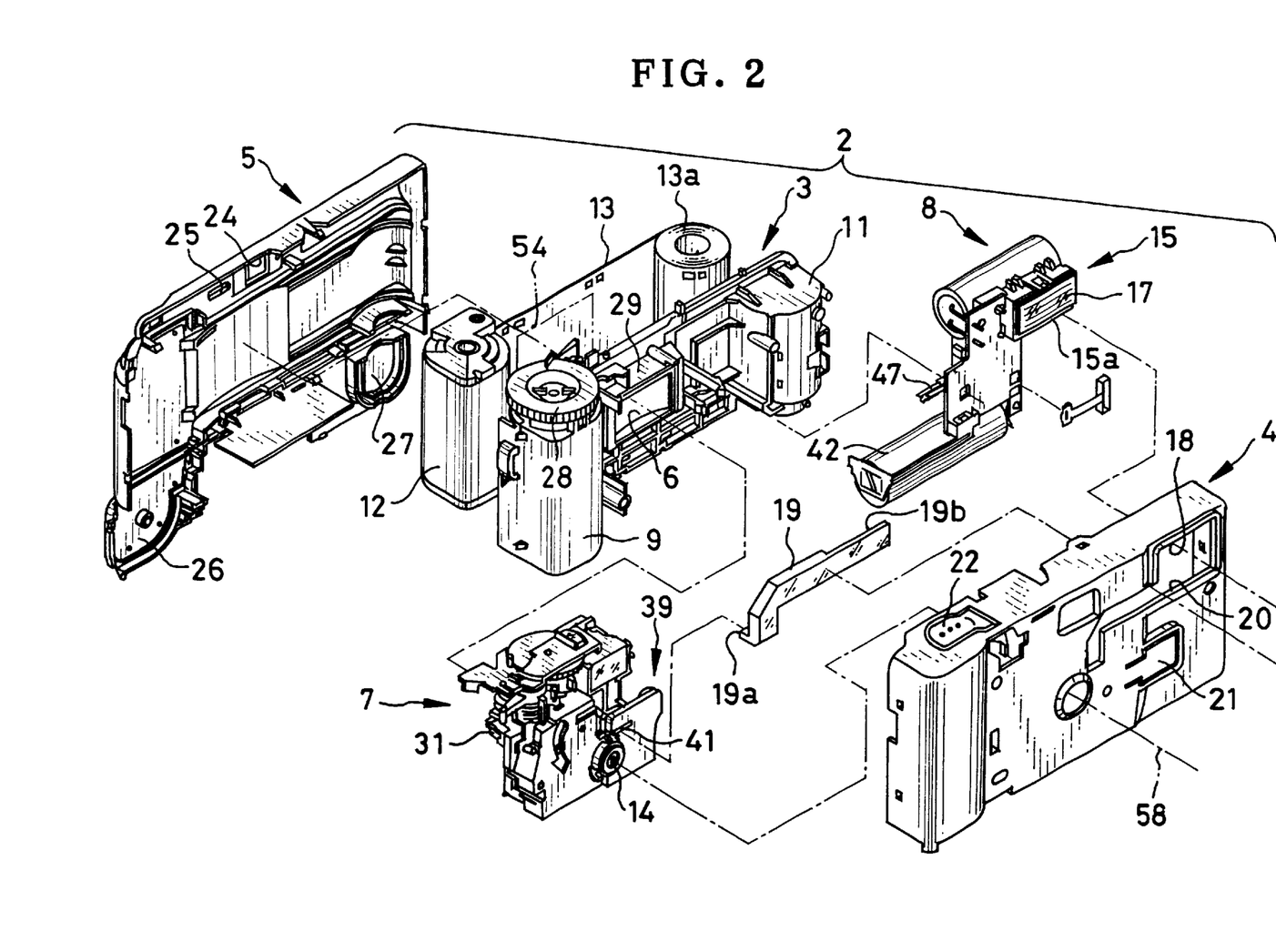
FIG. 2 is an exploded perspective view of the film unit of FIG. 1.

As shown in FIGS. 1 and 2, a film unit has a unit body 2 that consists of a base body portion 3, and front and rear covers 4 and 5 covering front and rear sides of the base body portion 3. An exposure unit 7 is attached to a front of an exposure opening 6 which is formed in a middle area of the base body portion 3, and a flash device 8 is attached to the base body portion 3 on one side of the exposure unit 7.

A cartridge chamber 9 and a film roll chamber 11 are formed integrally with the base body portion 3 on opposite horizontal sides of the exposure opening 6. These chambers 9 and 11 are respectively loaded with a cartridge shell 12 and an unexposed filmstrip 13 withdrawn from the cartridge shell 12 and coiled into a roll 13a in a manufacturing process of the film unit.

The front cover 4 has many openings, including those for exposing a taking lens 14 and a finder optical system 16, and an opening 18 for exposing a diffusion plate 17 of a flash projector 15 of the flash device 8. In connection to the opening 18, a light entrance window 20 is formed through the front cover 4, so as to partly expose a light guide member 19. A flash button 21 for tuning the flash device 8 on and off is formed below the light entrance window 20 by cutting out an U-shaped slit through the front cover 4.

Figure 3:
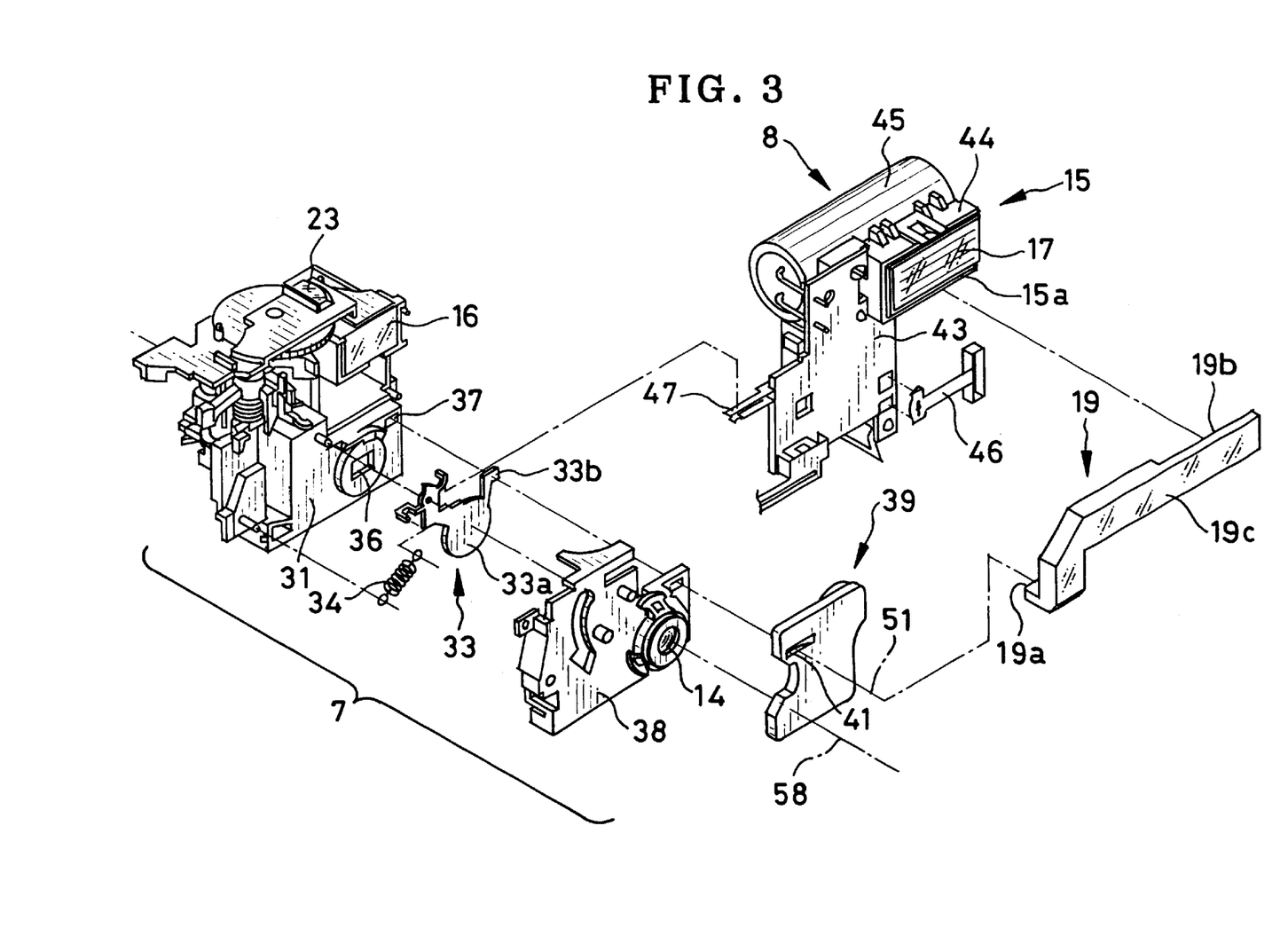
FIG. 3 is an exploded perspective view illustrating essential parts of a data recording device incorporated into the film unit of FIG. 1.

As shown in detail in FIG. 3, the light guide member 19 is formed from a transparent or semi-transparent plastic, and has an external light entering surface 19c that is exposed through the light entrance window 20, and a flash light entering portion 19b that is opposed to a lower portion 15a of the flash projector 15. Therefore, a fragment of flash light projected from the flash projector 15 of the flash device 8 directly enters the light guide member 19 through the flash light entering portion 19b. The lower portion 15a is not covered with the diffusion plate 17, so that the light guide member 19 and the diffusion plate 17 do not overlap. According to this configuration, the light guide member 19 does not increase the thickness or depth of the unit body 2. However, it is possible to cover the whole front of the light projector 15 with a diffusion plate and dispose the light guide member 17 in front of the diffusion plate so as to overlap in the lower portion 15a of the flash projector 15.

A shutter button 22 and a window for a frame counter 23 are formed on a top side of the front cover 4. The rear cover 5 has a finder eyepiece window 24, a flash charge indication window 25, and bottom lids 26 and 27 for closing bottoms of the cartridge chamber 9 and the film roll chamber 11 in a light-tight fashion. The bottom lid 26 is opened to take out the cartridge shell 12 from the cartridge chamber 9 after the entire length of the filmstrip 13 is exposed and wound up into the cartridge shell 9. A wrapping sheet 10 is put around the unit body 2, so as to cover up those elements and openings which are unnecessary for the user to take photographs.

A film winding wheel 28 is mounted on atop the cartridge chamber 9 so as to be rotatable about a not-shown shaft that protrudes from the bottom side of the film winding wheel 28, and is engaged with a spool of the cartridge shell 12. By rotating the film winding wheel 28 after each exposure, the exposed part is wound into the cartridge shell 12. When the filmstrip 13 is advanced by one frame, a lock lever of the exposure unit 7 locks the film winding wheel 28. In cooperation with this one-frame film winding operation, a shutter mechanism of the exposure unit 7 is charged or cocked.

The exposure opening 6 defines an exposure area 54 of the filmstrip 13 for a picture frame. An exposure chamber rear section 29 of a rectangular barrel shape is formed integrally with the body base portion 3 on the front side of the exposure opening 6. The exposure unit 7 is attached to the front of the exposure chamber rear section 29, so the exposure chamber rear section 29 and an exposure chamber front section 31 of the exposure unit 7 constitute an exposure chamber 32, as implied in FIG. 4. However, it is possible to form a whole exposure chamber either on the body base portion 3 or on the exposure unit 7.

As shown in detail in FIG. 3, the exposure unit 7 is an assembly wherein the taking lens 14, the shutter mechanism including a shutter blade 33 and a spring 34, a shutter charging mechanism, a film winding-locking mechanism including the lock lever, a frame counter mechanism including the frame counter 23, and the finder optical system 16 are mounted on the exposure chamber front section 31. A frame exposure aperture 36 and a data exposure aperture 37 are formed through a front wall of the exposure chamber front section 31. The shutter blade 33 has a main shutter portion 33a and a data shutter portion 33b as an integral body, so the frame exposure aperture 36 and the data exposure aperture 37 are concurrently opened and closed by the shutter blade 33. However, it is possible to provide a data shutter blade separately from a shutter blade for the frame exposure.

A shutter cover member 38 having the taking lens 14 mounted thereon is attached to the front of the exposure chamber front section 31 to cover up the shutter blade 33 and the spring 34, and a data display module 39 is attached to the front of the shutter cover member 38. The data display module 39 is constituted of an IC chip having a clock circuit, a liquid crystal driver and other circuits integrated thereinto, and an LCD panel 41 for displaying data to record on the filmstrip 13. The LCD panel 41 displays the data as light-permeable portions in an opaque background. The LCD panel 41 can display date data, such as the present date and time, on the basis of a clock signal from the clock circuit. The data display module 39 is supplied from a battery 42 that is mounted to the flash device 8.

A light projection terminal 19a of the light guide member 19 is located in front of the LCD panel 41. External light entering through the external light entering surface 19c or the flash light entering through the flash light entering portion 19b is conducted to the light projection terminal 19a by internal diffusion and reflection inside the light guide member 19, and is projected as a data recording light 51 toward the LCD panel 41.

According to this configuration, even when the film unit is used in a dark place, the flash light from the flash projector 15 is partly projected toward the LCD panel 41, so it is possible to obtain a sufficient amount of light enough for recording data at an adequate density on the filmstrip 13.

In the flash device 8, the flash projector 15, a capacitor 45, a flash charge switch 46, a synchronized triggering switch 47 and other elements of a flash circuit are mounted to or printed on a circuit board 43. The flash projector 15 is constituted of a base frame 44, the diffusion plate 17 attached to the front of the base frame 44, and a flash discharge tube and a reflector which are not-shown but disposed behind the diffusion plate 17. The flash charge switch 46 is turned on by pressing the flash button 21, thereby activating the flash circuit to start charging the capacitor 45. When the capacitor 45 is fully charged, a not-shown indication lamp starts lighting, and the light from the indication lamp is viewed through the charge indication window 25. The triggering switch 47 is turned on by the shutter blade 33 as the shutter blade 33 is fully opened, thereby triggering the flash discharge tube to strobe a flash light.

Figure 4:
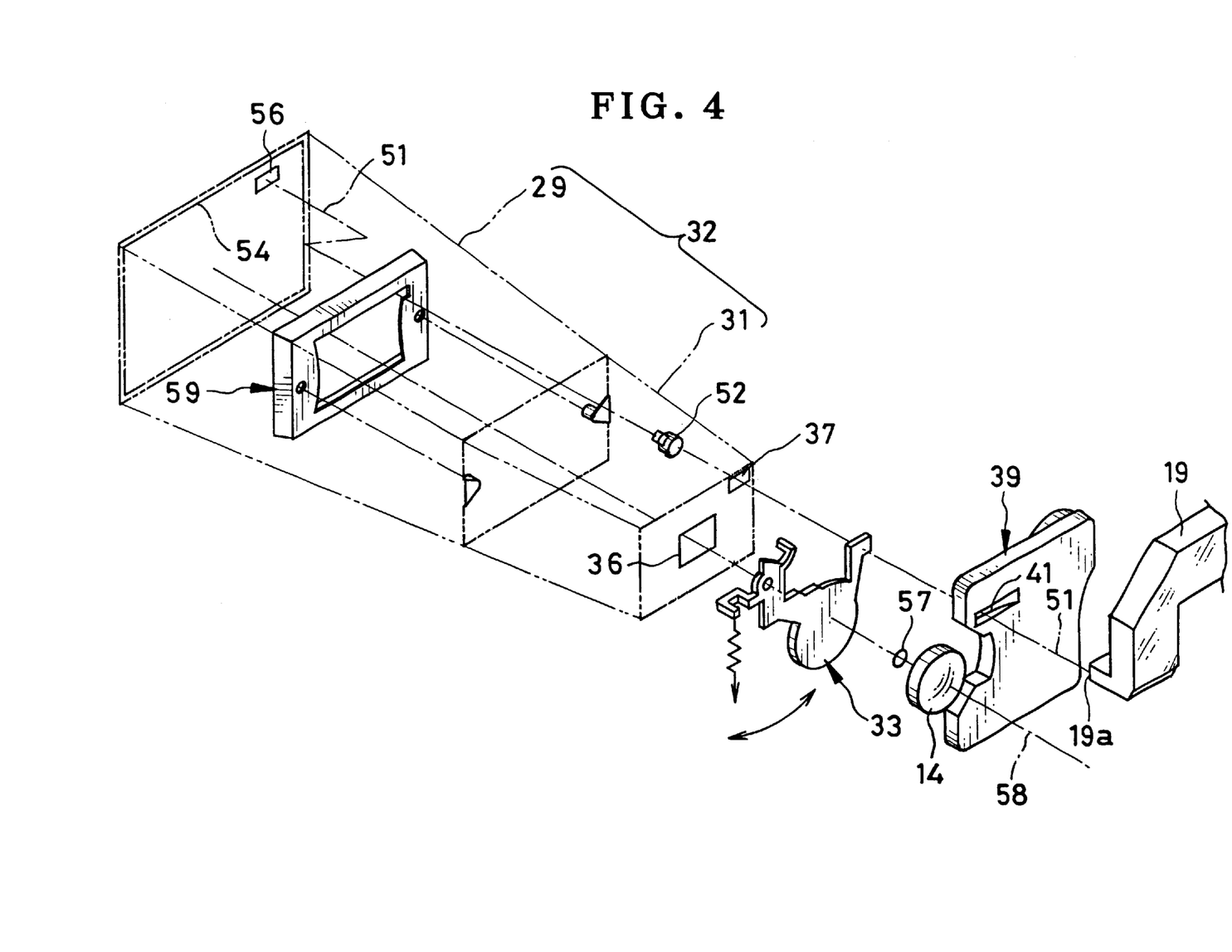
FIG. 4 is an exploded perspective view schematically illustrating optical systems for photographing a picture frame and data concurrently on a filmstrip.

As shown in FIG. 4, the data display module 39 is positioned such that the LDC panel 41 faces the data exposure aperture 37. While the shutter blade 33 swings to displace the data shutter portion 33b from the front of the data exposure aperture 37, the data recording light 51 projected from the light projection terminal 19a of the light guide member 19 travels through the LCD panel 41 and the data exposure aperture 37 into the exposure chamber 32. The light 51 is then focused on the filmstrip 13 through a data projecting lens 52 that is mounted inside the exposure chamber 32. Specifically, an image of data displayed on the LCD panel 41, e.g. the date data, is formed on the filmstrip 13 at a data recording area 56 inside the frame exposure area 54. Simultaneously, the main shutter portion 33a is displaced from the front of the frame exposure aperture 36, so a subject light 58 enters through the taking lens 14, a stop aperture 57 and the frame exposure aperture 36 into the exposure chamber 32. Thus, an image of a subject is formed on the filmstrip 13 in the frame exposure area 54. Designated by 59 is an extraneous light blocking member.

The light guide member 19 may have a light permeability of 50% to 100%. It is possible to provide the light guide member 19 with a coloring device for coloring the data recording light 51 by absorbing light components of a predetermined wavelength range. By coloring the data recording light 51, the data recorded in the data recording area 56 is printed in a particular color. For example, the plastic material of the light guide member 19 is mixed with dyestuffs, or the light guide member 19 is wrapped in a color film.

The operation of the film unit having the described construction will now be described.

When the photographer presses the shutter button 22 after rotating the film winding wheel 28 to advance the filmstrip 13 by one frame and charge the shutter mechanism, the shutter mechanism is activated to swing the shutter blade 33 to open and then close the frame exposure aperture 36 and the data exposure aperture 37.

Since the external light is collected through the external light entering surface 19c of the light guide member 19, and is projected as the data recording light 51 from the light projection terminal 19a toward the LCD panel 41, the data recording light 51 enters through the data exposure aperture 37 into the exposure chamber 32, and is projected through the data projecting lens 52 onto the data recording area 56 of the filmstrip 13. In this way, the data displayed on the LCD panel 41, e.g. the date of photography, is recorded in the data recording area 56.

If the external light is so bright that it is not necessary to project a flash light for photography, the amount of the data recording light 51 obtained only from the external light through the light guide member 19 is sufficient for recording data at an adequate density. If, on the contrary, the external light is so dark that it is necessary to project a flash light for photography, the photographer ordinarily presses the flash button 21 to charge the flash device 8. When the photographer presses the shutter button 22 after the flash device 8 is fully charged, the shutter blade 33 is caused to swing to open and then close the frame and data exposure apertures 36 and 37, and also turn on the triggering switch 47. Thereby, the charged voltage is discharged through the flash discharge tube, so a flash light is projected from the flash projector 15. Needless to say, the triggering switch 47 is turned on each time the shutter mechanism is released, but the flash projector 15 cannot project light unless the flash circuit is fully charged.

The flash light is mostly projected forward from the flash projector 15. The diffusion plate 17 directs the flash light toward a photographic subject in front of the film unit, and some part of the flash light is reflected from the subject back to the film unit. The reflected light enters through the taking lens 14 and the frame exposure aperture 36 into the exposure chamber 32, and is focused as the subject light 58 on the filmstrip 13 in the frame exposure area 54. The light reflected from the subject also falls on the external light entering surface 19c, and is conducted through the light guide member 19 to the light projection terminal 19a. In addition to that, the flash light projected toward the flash light entering portion 19b is conducted through the light guide member 19 to the light projection terminal 19a. Therefore, the data recording light 51 projected from the light projection terminal 19a has an sufficient intensity for the data recording even in a dark place.

Figure 5:
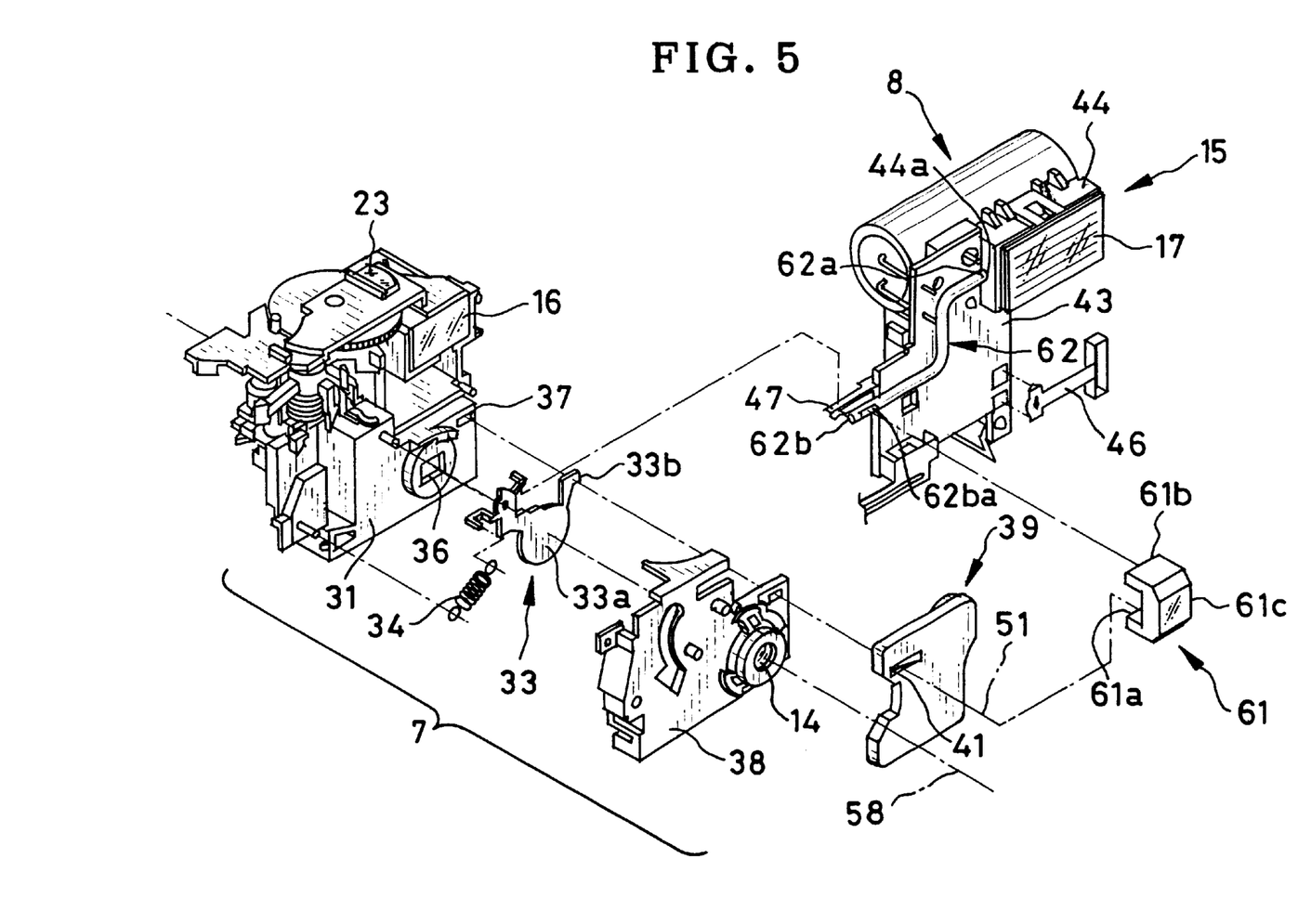
FIG. 5 is an exploded perspective view illustrating essential parts of a data recording device according to a second embodiment of the invention.
Figure 6:
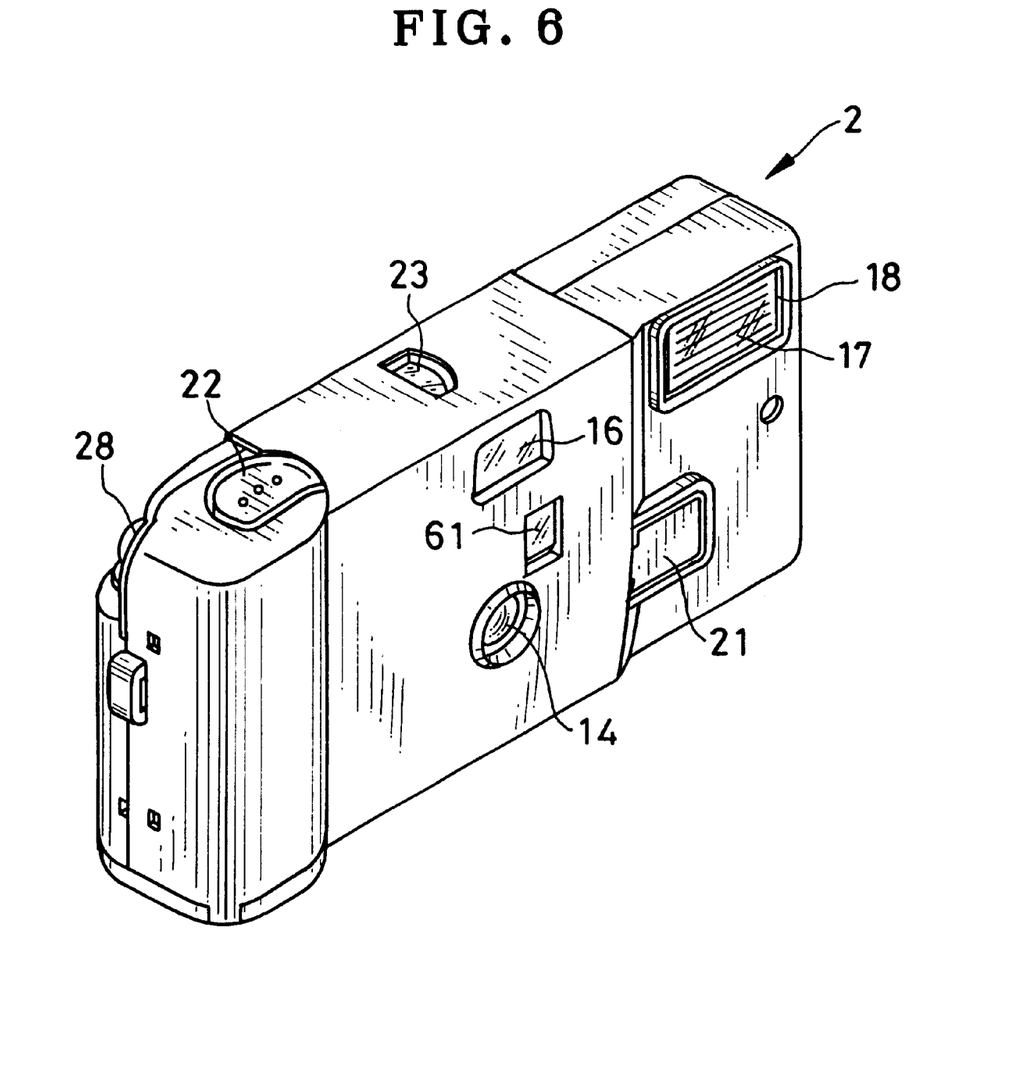
FIG. 6 is a perspective view of a film unit according to the second embodiment of the invention.

FIGS. 5 and 6 show a data recording device and a film unit according to the second embodiment of the invention, wherein the same or like elements are designated by the same reference numerals as in the first embodiment, and the description of these elements is omitted for brevity sake. The following description relates only to those elements essential to the second embodiment. The same applies to other embodiments shown in FIGS. 7 and 8.

According to the second embodiment, the data recording device is provided with a first light guide member 61 and a second light guide member 62. The first light guide member 61 is formed from a transparent or semi-transparent plastic, and has a light projection terminal 61a for projecting light toward the LCD panel 41. The first light guide member 61 has an external light entering surface 61c that is exposed to the front of the film unit, as shown in FIG. 6. Unlike the light guide member 19 of the first embodiment, the first light guide member 61 has a flash light entering terminal 61b that protrudes rearward above the light projection terminal 61a, and the external light entering surface 61c is not horizontally elongated.

The second light guide member 62 is made of optical fibers or the like for conducting the flash light. The second light guide member 62 has a light entering terminal 62a inserted into the flash projector 15 through an opening 44a formed through a base frame 44. An end portion 62b of the second light guide member 62 opposite to the flash light entering terminal 62a extends behind the flash light entering terminal 61b of the first light guide member 61. The flash light is conducted through the second light guide member 62 according to the total reflection, and is projected from a surface area 62ba of the end portion 62b toward the flash light entering terminal 61b of the first light guide member 61. For this purpose, the surface area 62ba is roughed or grained. Thus, the first light guide member 61 also conducts the flash light to the LCD panel 41.

According to the second embodiment, the same effect as the first embodiment is achieved by use of the first and second light guide members 61 and 62. Moreover, since the second light guide member 62 is made of flexible optical fibers, the data recording device of the second embodiment is preferable in term of compactness and design-flexibility of the film unit.

Figure 7:
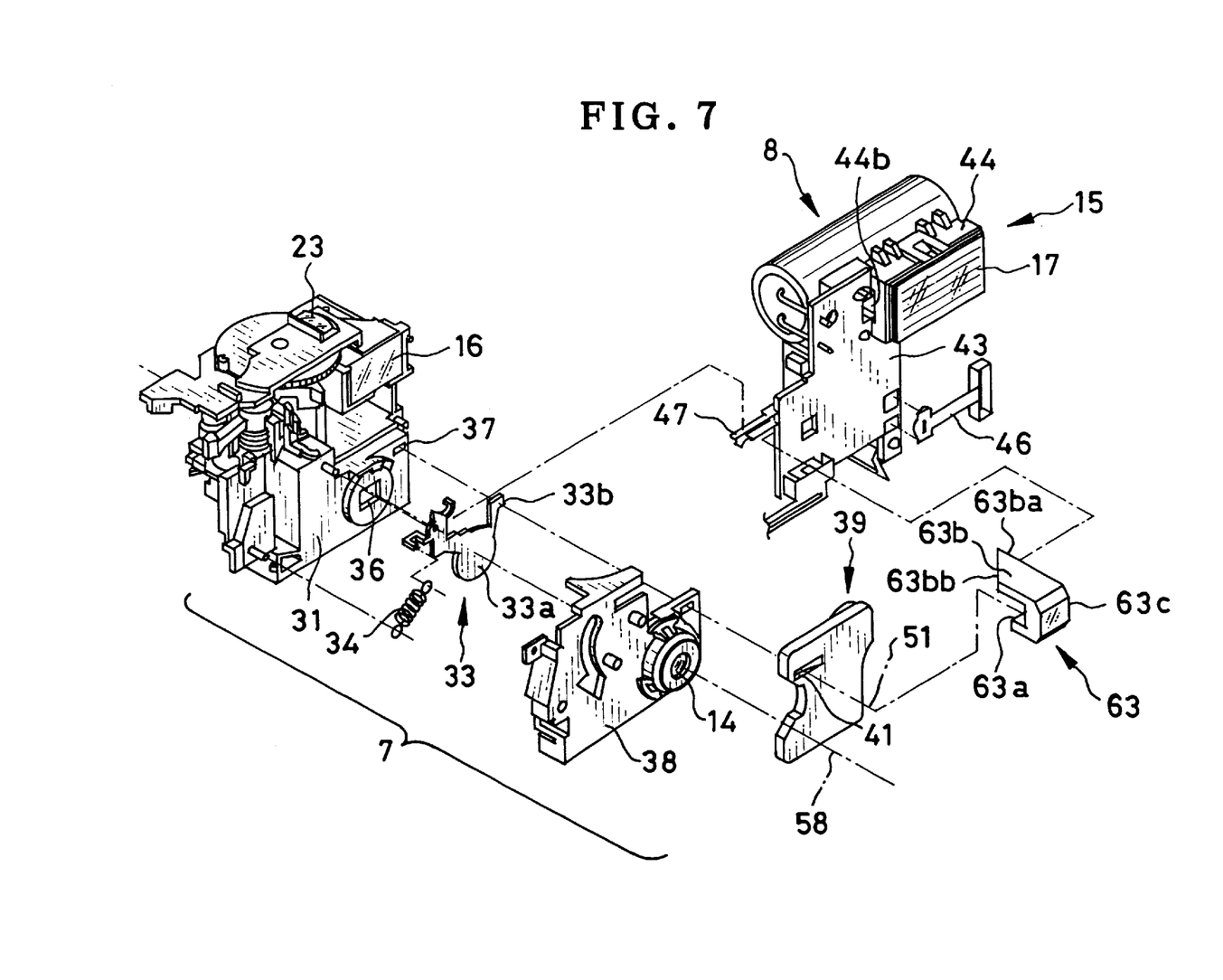
FIG. 7 is an exploded perspective view illustrating essential parts of a data recording device according to a third embodiment of the invention.

According to the third embodiment shown in FIG. 7, a single light guide member 63 formed from a transparent plastic is provided for conducting the flash light and the external light to the LDC panel 41. The light guide member 63 has a similar shape to the first light guide member 61 of the second embodiment, but a flash light entering terminal 63b extends under the triggering switch 47 and protrudes rearward from the circuit board 43 of the flash device 8. One side surface 63ba of the flash light entering terminal 63b is oriented toward the light projector 15. An opening 44b is formed through a base frame 44 of the flash projector 15 in a side portion opposing to the side surface 63ba of the flash light entering terminal 63b that is located behind the circuit board 43.

According to this configuration, the flash light from the flash projector 15 partly leaks through the opening 44b, and falls on the side surface 63*ba* of the flash light entering terminal 63*b* of the light guide member 63. The light entering through the side surface 63*ba* is reflected from a reflection surface 63*bb* that is inclined 45 degrees to the side surface 63*ba* to change the direction of optical axis by an angle of 90° degrees, and thereafter conducted through the light guide member 63 to a light projection terminal 63*a*. An external light entering surface 63*c* is exposed to the front of the film unit, in the same way as shown with respect to the first light guide member 61 in FIG. 6.

The third embodiment also achieves the same effect as the above embodiment. That is, a sufficient amount of light enough for recording data at an adequate density on the filmstrip 13 is projected toward the LCD panel 41 even when the film unit is used in a dark place, because the flash light from the flash projector 15 is partly conducted to the LCD panel 41.

Figure 8:
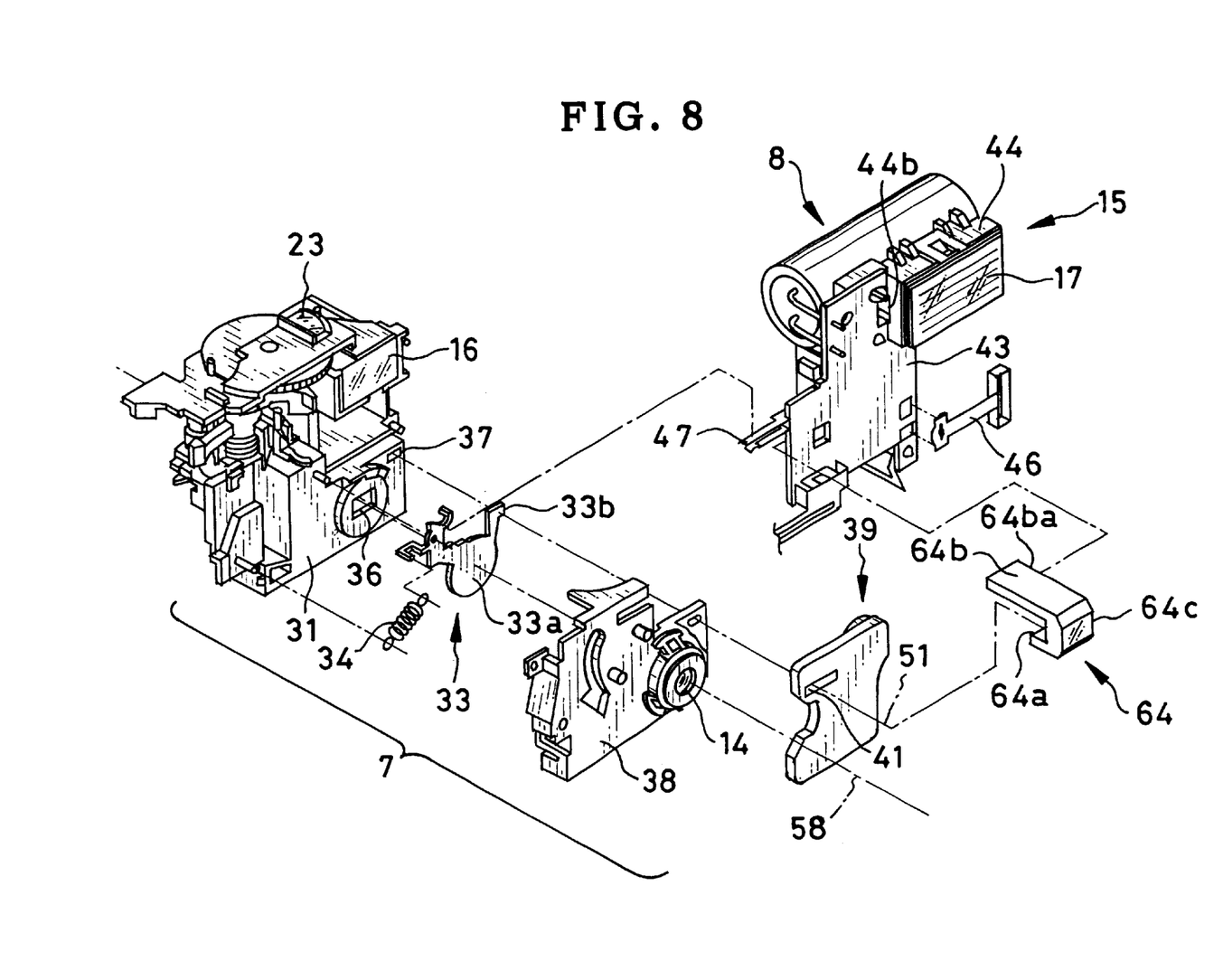
FIG. 8 is an exploded perspective view illustrating essential parts of a data recording device according to a fourth embodiment of the invention.

Although the light guide member 63 has the inclined reflection surface 63*bb* in opposition to the side surface 63*ba* to conduct the light entering through the side surface 63*ba* toward the light projecting terminal 63*a*, the reflection surface 63*ba* may be omitted as shown, for example, in FIG. 8.

Instead, a light guide member 64 is formed from a semi-transparent plastic that is composed by mixing a transparent plastic with fluorescent dyestuffs, e.g. LISA-Plastic (a trade name: produced by Bayer Co.). By virtue of the fluorescent dyestuffs, the light guide member 64 converges and conducts light more effectively.

This is because, the flash light entering though a side surface 64*ba* of a flash light entering terminal 64*b* is radiated as fluorescent light from the fluorescent dyestuffs inside the light guide member 64, so the intensity of light radiated inside the light guide member 64 is increased as compared to those light guide members where the fluorescent dyestuffs are not mixed. As a result, the intensity of light conducted through the light guide member 64 according to the total reflection is increased correspondingly. In this way, the light guide member 64 projects light of a sufficient intensity from its light projection terminal 64*a* even while there is not an inclined reflection surface in opposition to the side surface 64*ba*.

The light guide member 19 of the first embodiment or the first light guide member 61 of the second embodiment may preferably be made of the LISA-Plastic or another plastic mixed with fluorescent dyestuffs to improve the light conduction efficiency of the light guide member. Of course, the light guide members of the second to fourth embodiments may be provided with a coloring device in the same way as described with respect to the first embodiment.

It is possible to conduct the flash light from the flash projector 15 to the flash light entering terminal 64*b* of the light guide member 64 through a light guide member made of optical fibers, like as the second embodiment shown in FIG. 5. In that case, the second light guide member is disposed behind the circuit board 43 with its one terminal inserted in the opening 44*b*.

It is possible to use more than three light guide members, or use only optical fibers for conducting light. Although the external light entering surface is exposed to the front of the film unit in any of the above embodiments, the external light entering surface may be exposed to the top side or another side of the film unit insofar as it is convenient for collecting a sufficient amount of external light. The external light entering surface may be protruded from the outside surface of the unit body 2, although it is aligned with the outside surface of the unit body 2.

It is also possible to provide a light guide member for the flash light separately from a light guide member for the external light insofar as these light guide members conduct light toward a common light projection terminal.

The present invention is applicable not only to a data recording device where a data recording light is projected from the front of the filmstrip, but also to a data recording device where a back side portion of the filmstrip is exposed to a data recording light that is projected onto the filmstrip without using a data projecting lens. This type of data recording device is widely used in conventional compact cameras.

That is, the materials as well as the shape and arrangement of the light guide member or members are not limited to the above embodiment insofar as they can conduct the flash light and the external light to a data display panel, i.e. the LCD panel 41 in the above embodiments, of the data recording device.

Instead of the data display module 39, it is possible to use a data sheet wherein data is displayed as light-permeable portions formed in an opaque sheet. In that case, the data sheet should preferably be changeable with another data sheet. The data to record is not to be limited to the date data, but may be a simple phrase, a logotype or the like.

Although the photo film cartridge contained in the film unit shown in the drawings is of IX240 type, the present invention is applicable also to those film units containing a conventional 135 type photo film cartridge or any type of film units.

Thus, the present invention is not to be limited to the above embodiments but, on the contrary, various modifications may be possible to those skilled in the art without departing from the scope of appended claims.

What is claimed is:

1. A lens-fitted photo film unit with a data recording device for recording data on a filmstrip contained in the film unit, by projecting a data recording light onto the filmstrip through a data display device that displays the data to record, the film unit comprising:

a first light guide member having an external light entering surface exposed to outside of the film unit, the first light guide member conducting external light that enters through the external light entering surface to the data display device, to use the external light for the data recording light; and a second light guide member for conducting a flash light partly from a built-in flash device of the film unit to the first light guide member, to use the flash light for the data recording light in addition to the external light.

2. A lens-fitted photo film unit as claimed in claim 1, wherein at least one of the first and second light guide members is formed from a transparent or semi-transparent plastic.

3. A lens-fitted photo film unit as claimed in claim 2, wherein the plastic is composed by mixing a transparent plastic material with fluorescent dyestuffs.

4. A lens-fitted photo film unit as claimed in claim 2, wherein the plastic is composed by mixing a transparent plastic material with dyestuffs that absorbs light components of a predetermined wavelength range.

5. A lens-fitted photo film unit as claimed in claim 2, wherein the first and second light guide members are formed as an integral light guide member from the transparent or semi-transparent plastic.

6. A lens-fitted photo film unit as claimed in claim 5, wherein the integral light guide member has an external light entering surface that is exposed to a front side of the film unit and elongated horizontally below a flash projector of the flash device, and a flash light entering portion formed on a rear side portion of the external light entering surface so as to oppose to a front portion of the flash projector.

7. A lens-fitted photo film unit as claimed in claim 2, wherein the first light guide member is formed from the transparent or semi-transparent plastic, whereas the second light guide member is made of optical fibers.

8. A lens-fitted photo film unit as claimed in claim 1, wherein a flash projector of the flash device is provided with a hole, so as the flash light leaking out through the hole enters the second light guide member.

9. A lens-fitted photo film unit as claimed in claim 7, wherein a flash projector of the flash device is provided with a hole, so as the flash light leaking out through the hole enters the second light guide member.

\* \* \* \* \*